United States Patent
Takeuchi et al.

(10) Patent No.: US 9,789,705 B2
(45) Date of Patent: Oct. 17, 2017

(54) INK JET RECORDING METHOD

(71) Applicant: CANON KABUSHIKI KAISHA, Tokyo (JP)

(72) Inventors: Keiichirou Takeuchi, Komae (JP); Koichiro Nakazawa, Machida (JP); Fumihiro Goto, Kawasaki (JP); Eisuke Nishitani, Tokyo (JP); Kanako Soma, Yokohama (JP); Takumi Otani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/084,718

(22) Filed: Mar. 30, 2016

(65) Prior Publication Data
US 2016/0311235 A1    Oct. 27, 2016

(30) Foreign Application Priority Data

Apr. 24, 2015  (JP) ................ 2015-089105

(51) Int. Cl.
*B41J 11/00*    (2006.01)
*B41M 5/00*    (2006.01)
(Continued)

(52) U.S. Cl.
CPC ............. *B41J 11/0015* (2013.01); *B41J 2/01* (2013.01); *B41M 5/0017* (2013.01);
(Continued)

(58) Field of Classification Search
CPC .... B41J 11/0015; B41J 2/01; B41J 2002/012; B41J 2/211; B41J 2/2114; B41J 2/0057;
(Continued)

(56) References Cited

U.S. PATENT DOCUMENTS 6,050,676 A    4/2000  Sugimoto et al.
6,084,006 A    7/2000  Kashiwazaki et al.
(Continued)

FOREIGN PATENT DOCUMENTS

JP    2004-181803 A    7/2004
JP    2013-018127 A    1/2013

OTHER PUBLICATIONS

Sep. 27, 2016 European Search Report in European Patent Appln. No. 16000754.8.

*Primary Examiner* — Julian Huffman
*Assistant Examiner* — Michael Konczal
(74) *Attorney, Agent, or Firm* — Fitzpatrick, Cella, Harper & Scinto (57) ABSTRACT

An ink jet recording method in which an image is formed by applying onto a recording medium a reaction liquid, an aqueous pigment ink containing an anionic polymer aggregatable by the reaction liquid and a resin-containing aqueous liquid containing an anionic polymer aggregatable by the reaction liquid to form an image, the method including the steps of applying the reaction liquid to the recording medium; applying the aqueous pigment ink to a surface of the recording medium to which the reaction liquid is applied by an ink jet method to form an image; and applying the resin-containing aqueous liquid to the image formed on the recording medium by the ink jet method. The surface tension of the resin-containing aqueous liquid is higher than the surface tension of the aqueous pigment ink.

14 Claims, 2 Drawing Sheets

(51) Int. Cl.
*B41M 5/025* (2006.01)
*B41J 2/01* (2006.01)
*C09D 11/30* (2014.01)
*C09D 125/14* (2006.01)
*C09D 133/06* (2006.01)

(52) U.S. Cl.
CPC ............ *B41M 5/0256* (2013.01); *C09D 11/30* (2013.01); *C09D 125/14* (2013.01); *C09D 133/06* (2013.01)

(58) Field of Classification Search
CPC .... C09D 133/06; C09D 11/30; B41M 5/0017; B41M 5/0256
See application file for complete search history.

(56) References Cited

U.S. PATENT DOCUMENTS

| | | | |
|---|---|---|---|
| 6,162,510 A | 12/2000 | Kashiwazaki et al. | |
| 6,164,772 A | 12/2000 | Koitabashi et al. | |
| 6,203,604 B1 | 3/2001 | Kashiwazaki et al. | |
| 6,248,482 B1 | 6/2001 | Kashiwazaki et al. | |
| 6,497,478 B1 | 12/2002 | Sugimoto et al. | |
| 6,659,601 B2 | 12/2003 | Goto et al. | |
| 6,729,718 B2 | 5/2004 | Goto et al. | |
| 6,893,114 B2 | 5/2005 | Yano et al. | |
| 7,654,662 B2 | 2/2010 | Nakazawa et al. | |
| 7,922,317 B2 | 4/2011 | Nakazawa et al. | |
| 7,988,276 B2 | 8/2011 | Nakazawa et al. | |
| 8,328,340 B2 * | 12/2012 | Ogawa | C09D 11/30 347/100 |
| 8,348,408 B2 * | 1/2013 | Irita | C09D 7/125 347/100 |
| 2010/0236447 A1 * | 9/2010 | Sakai | C09D 11/322 106/31.6 |
| 2012/0128949 A1 * | 5/2012 | Goto | B41M 5/0017 428/207 |
| 2014/0078214 A1 * | 3/2014 | Mizutani | C09D 11/40 347/20 |

* cited by examiner

INK JET RECORDING METHOD

BACKGROUND OF THE INVENTION

Field of the Invention

The present invention relates to an ink jet recording method.

Description of the Related Art

An ink jet recording apparatus has an ink ejection orifice for ejecting an ink on a recording medium to form an image and can record a high-definition image at a high speed.

In recent years, utilization of an ink jet recording apparatus for commercial printing has also been widely investigated. In the ink jet recording apparatus for commercial printing, a pigment ink is generally used from the viewpoint of weather resistance of a printed article. At that time, such an ink is required to enable forming a good image even on a recording medium which does not have an ink receiving layer for fixing a pigment ink droplet impacted on a paper surface as in exclusive paper for ink jet, such as normal printing paper.

As a method for meeting the above required performance, there may be mentioned an image forming method in which a reaction liquid is applied on to a recording surface of a recording medium before the impact of an ink droplet to bring the ink droplet into contact with the reaction liquid applied, thereby causing aggregation of a component contained in an ink to fix the ink droplet on the recording medium. According to this image forming method, a good image from which image defects such as bleeding and beading are inhibited can be formed.

On the other hand, in the ink jet recording apparatus for commercial printing, it is attempted to provide such an added value that an image with photographic image quality is formed on normal printing paper. In order to achieve the photographic image quality in a printed article, high-price exclusive paper for photography is generally required. If the image with photographic image quality can be formed on cheap printing paper, however, such an added value that an image with photographic image quality can be formed at low cost can be given to the ink jet recording apparatus.

The photographic image quality is required to have a high gloss feeling and high gloss uniformity. On the exclusive paper for ink jet, the high gloss feeling and the high gloss uniformity are achieved by applying a transparent ink to an image formed with a pigment ink.

Japanese Patent Application Laid-Open No. 2004-181803 discloses a method for improving the gloss uniformity of an image by alleviating bumpy irregularities formed by impact dots of a pigment ink formed as a projected portion on a surface of a recording medium by applying a transparent liquid which contains a resin and does not contain a colorant thereto.

In addition, Japanese Patent Application Laid-Open No. 2013-18127 discloses an ink jet recording method using a pigment ink and a coating liquid applied later, in which the hydrophilicity of a film forming resin particle contained in the coating liquid is made higher than the hydrophilicity of a film forming resin particle contained in the pigment ink. In Japanese Patent Application Laid-Open No. 2013-18127, a combination of such pigment ink and coating liquid accelerates the formation of a film by the coating liquid on the surface of a pigment contained in an ink film on a recording medium and also alleviates bumpy irregularities of the film itself by the coating liquid, thereby realizing the high gloss feeling and the high gloss uniformity.

SUMMARY OF THE INVENTION

According to an embodiment of the present invention, there is provided an ink jet recording method in which an image is formed by applying onto a recording medium a reaction liquid, an aqueous pigment ink containing an anionic polymer aggregatable by the reaction liquid and a resin-containing aqueous liquid containing an anionic polymer aggregatable by the reaction liquid, the method comprising the steps of:

applying the reaction liquid to the recording medium; applying the aqueous pigment ink to a surface of the recording medium to which the reaction liquid is applied by an ink jet method to form an image; and applying the resin-containing aqueous liquid to the image formed on the recording medium by the ink jet method, wherein the surface tension of the resin-containing aqueous liquid is higher than the surface tension of the aqueous pigment ink.

According to another embodiment of the present invention, there is also provided an ink jet recording method in which an image is formed by applying onto a first recording medium a reaction liquid, an aqueous pigment ink containing an anionic polymer aggregatable by the reaction liquid and a resin-containing aqueous liquid containing an anionic polymer aggregatable by the reaction liquid to form an intermediate image followed by transferring the intermediate image formed on the first recording medium to a second recording medium, the method comprising the steps of:

applying the reaction liquid to the first recording medium; applying the aqueous pigment ink to a surface of the first recording medium to which the reaction liquid is applied by an ink jet method to form an image; and applying the resin-containing aqueous liquid to the image formed on the first recording medium by the ink jet method, wherein the surface tension of the resin-containing aqueous liquid is higher than the surface tension of the aqueous pigment ink.

According to the present invention, there can be provided an ink jet recording method which does not easily cause image cracking and can form an image having high glossiness and gloss uniformity.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

According to an investigation by the present inventors, it has been found that when an image formed on any one of various kinks of printing paper, not exclusive paper for ink jet, by an ink jet method is treated with a liquid which contains a resin for improving glossiness of the image and does not contain a coloring material like the methods disclosed in Japanese Patent Application Laid-Open No. 2004-181803 and Japanese Patent Application Laid-Open No. 2013-18127, "image cracking" which is cracking caused over the whole image may occur in some cases. In particular, it has been found that the image cracking may easily occur in some cases in the case of the method disclosed in Japanese Patent Application Laid-Open No. 2013-18127, in which the affinity of the resin particle contained in the coating liquid for the pigment forming the image on the recording medium is improved.

The present invention has been made while paying attention to the above problem, and it is an object of the present invention to provide an ink jet recording method which does not easily cause image cracking and can form an image having high glossiness and gloss uniformity.

Embodiments for carrying out the present invention will now be described.

Ink Jet Recording Method

The ink jet recording method according to the present invention will be described with reference to the schematic views of the ink jet image forming apparatus illustrated in FIGS. 1 and 4.

As for examples of the ink jet recording method according to the present invention, there are mentioned "direct drawing type ink jet recording method" in which an ink and a liquid composition are directly applied to a recording medium to record an image, and "transfer type ink jet recording method" in which an ink and a liquid composition are applied to a transfer member as a first recording medium to form an intermediate image followed by transferring the intermediate image to a second recording medium such as paper to record an image. The respect ink jet recording methods will now be described.

(1) Direct Drawing Type Ink Jet Recording Method

Figure 1:
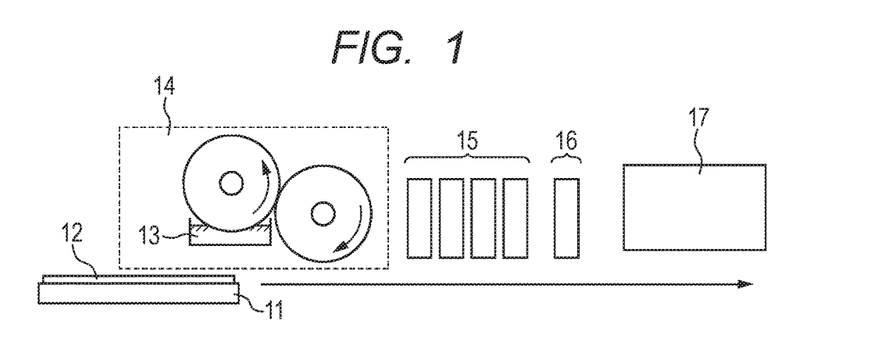
FIG. 1 illustrates an example of a direct drawing type ink jet image forming apparatus for carrying out the present invention.

FIG. 1 schematically illustrates a direct drawing type ink jet image forming apparatus. In FIG. 1, a recording medium 12 is first fixed to a conveyance stage (also referred to as a sheet fixing member) 11 to convey the recording medium in a direction of the arrow. A number of suction holes are made in a surface of the conveyance stage 11, on which the recording medium 12 is placed and fixed, and so the recording medium 12 can be fixed when needed by sucking it through these holes. A reaction liquid is applied to the recording medium 12 conveyed in the direction of the arrow.

In the example illustrated, a roller type coating device 14 is provided for applying the reaction liquid to the recording medium 12. This roller type coating device 14 has a coating roller system composed of a reaction liquid tank for storing the reaction liquid 13, a coating roller for applying the reaction liquid to the surface of the recording medium and a supply roller for supplying the reaction liquid to the coating roller from the reaction liquid tank. The reaction liquid 13 contains components respectively causing aggregation of a component contained in a pigment ink and a component contained in a resin-containing liquid. The apparatus illustrated in FIG. 1 has liquid ejection heads 15 and 16 according to an ink jet system, and the liquid ejection head 15 is used for forming an image with the pigment ink, and the liquid ejection head 16 is used for applying the resin-containing liquid.

When the recording medium 12 to which the reaction liquid has been applied reaches the position of the liquid ejection head 15 for ejecting the pigment ink, the pigment ink is ejected from the liquid ejection head 15 to form an image. At that time, the component contained in the pigment ink is aggregated by contact of the reaction liquid applied in advance with the pigment ink to form a coloring ink layer.

When the recording medium 12 further reaches the position of the liquid ejection head 16, the resin-containing liquid is applied on to the image formed in advance. The resin-containing liquid is also aggregated by contact with the reaction liquid like the pigment ink to form a resin layer containing no coloring material on the image. In the case where drying is further required thereafter, the recording medium 12 having the image is caused to reach the position of a hot air drying device 17 to conduct hot air drying.

When the resin layer containing no coloring material is formed on the image after that image is formed with the pigment ink, such an image cracking defect that the interior of the image is cracked may occur in some cases according to application conditions of the pigment ink and the resin-containing liquid. On the contrary, the image forming method according to the present invention has an effect to inhibit the image cracking because both pigment ink and resin-containing liquid are aqueous, and the surface tension of the aqueous resin-containing liquid is made higher than the surface tension of the aqueous pigment ink.

Recording Medium

No particular limitation is imposed on the recording medium used in the present invention. In order to form an image having photographic image quality, it is favorable to achieve a high gloss feeling for the image. Accordingly, for forming such an image having photographic image quality, such a recording medium that the smoothness of its image forming surface is good is desired. Coated paper having a coating layer is favorable as a recording medium capable of providing a recording surface having high smoothness, and cast-coated paper having high smoothness is more favorable.

As examples of the coated paper, there may be mentioned coat paper sheets such as art paper, high-quality coat paper and medium-quality coat paper, light weight coat paper sheets such as high-quality light weight coat paper and medium-quality light weight coat paper, and coat paper sheets such as fine coated printing paper. The coating weight of the coating layer of the coated paper is about 40 $g/m^2$ on both surfaces of the art paper, about 20 $g/m^2$ on both surfaces of the high-quality coat paper and the medium-quality coat paper, about 15 $g/m^2$ on both surfaces of the high-quality light weight coat paper and the medium-quality light weight coat paper, and 12 $g/m^2$ or less on both surfaces of the fine coated printing paper. Examples of the art paper include TOKUBISHI ART (product of Mitsubishi Paper Mills Co.) and SATIN KINFUJI (product of Oji Paper Co., Ltd.).

Examples of the coat paper include OK TOP COAT (product of Oji Paper Co., Ltd.), AURORA COAT (product of Nippon Paper industries Co., Ltd.) and RECYCLE COAT T-6 (product of Nippon Paper industries Co., Ltd.), and examples of the light weight coat paper include U-LITE (product of Nippon Paper industries Co., Ltd.), NEW V-MATT (product of Mitsubishi Paper Mills), NEW AGE (product of Oji Paper Co., Ltd.), RECYCLE MATT T-6 (product of Nippon Paper industries Co., Ltd.) and PISM (product of Nippon Paper industries Co., Ltd.). Examples of the fine coated printing paper include AURORA L (product of Nippon Paper industries Co., Ltd.) and KINMARI Hi-L (product of Hokuetsu Paper Co., Ltd.). In addition, examples of the cast-coated paper include MIRROR COAT G (product of Oji Paper Co., Ltd.), SA KINFUJI PLUS (product of Oji Paper Co., Ltd.) and HI-MCKINLEY ART (Product of Gojo Paper Mfg. Co., Ltd.).

Reaction Liquid

In the present invention, the reaction liquid is applied on to the recording medium to aggregate and solidify a component contained in the pigment ink, whereby a good image can be formed with image defects such as bleeding and beading inhibited. In addition, the resin-containing liquid applied to the image formed with the pigment ink and the reaction liquid can also aggregate and solidify a resin component by a reaction with the reaction liquid to form a good resin layer.

Components of the reaction liquid and a method for applying the reaction liquid on to the recording medium will hereinafter be described.

Components of Reaction Liquid

The reaction liquid contains a viscosity increasing component for the pigment ink. Here, the viscosity increase of the pigment ink means not only a case where viscosity increase of the whole pigment ink is recognized by contact of the pigment ink with the viscosity increasing component, but also a case where topical viscosity increase is caused by aggregation of a part of the pigment ink.

For example, a metal ion or a polymer flocculant is used without particular limitation as the viscosity increasing component. However, a substance causing pH change of the pigment ink to aggregate it is favorable, and an organic acid is more favorable.

Examples of the organic acid include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyridonecarboxylic acid, pyronecarboxylic acid, pyrrolcarboxylic acid, furancarboxylic acid, pyridinecarboxylic acid, coumalic acid, thiophenecarboxylic acid, nicotinic acid, hydroxysuccinic acid and dihydroxysuccinic acid. These acids may be used either singly or in any combination thereof.

An aqueous medium may be used in the reaction liquid for adjusting the viscosity and flowability thereof. Water or a mixed solvent of water and a water-soluble organic solvent may be used as the aqueous medium. The content of the water-soluble organic solvent is favorably 3.0% by mass or more and 50.0% by mass or less based on the total mass of the aqueous medium. No particular limitation is imposed on the water-soluble organic solvent, and for example, publicly known solvents are mentioned. Examples of the water-soluble organic solvent include alcohols, glycols, alkylene glycols the alkylene group of which has 2 to 6 carbon atoms, polyethylene glycols, nitrogen-containing compounds and sulfur-containing compounds. The water-soluble organic solvents may be used either singly or in any combination thereof. Deionized water (ion-exchanged water) is favorable as water. The content of water is favorably 5.0% by mass or more and 95.0% by mass or less based on the total mass of the aqueous medium. The content of the aqueous medium is favorably 5% by mass or more and 60% by mass or less based on the total mass of the reaction liquid though it varies according to the kind of the viscosity increasing component.

Various additives such as a resin particle, a water-soluble resin, a surfactant, a pH adjustor, a rust preventive, a preservative, a mildewproofing agent, an antioxidant, an antireductant, an evaporation accelerator, a chelating agent and a resin may be added into the reaction liquid as needed. However, any additive inhibiting the storage stability of the reaction liquid itself and aggregation is unfavorable. Incidentally, the surface tension of the reaction liquid can be suitably adjusted by adding a surfactant.

Reaction Liquid Applying Method

Any one of various methods heretofore known may be suitably used. Examples thereof include die coating, blade coating, gravure coating, offset coating and spray coating. The reaction liquid may also be applied to the recording medium by using an ink jet method. In addition, a combination of some methods thereof is also extremely favorable.

Image Formation

The pigment ink and the resin-containing liquid are applied to the recording medium to which the reaction liquid has been applied. As a unit for applying these liquids to the recording medium, an apparatus having a liquid ejection head of an ink jet system is used. Examples of a liquid ejection system by an ink jet method include a system in which film boiling of ink is caused by an electrothermal converter to form a bubble, thereby ejecting the ink, a system in which an ink is ejected by an electromechanical convertor and a system in which an ink is ejected by using static electricity. No particular limitation is imposed on the liquid ejection system of the liquid ejection head, and any one of liquid ejection heads of various systems may be used. Among others, the liquid ejection head of the system using the electrothermal converter is favorably used from the viewpoint of high-speed and high-density printing in particular.

No particular limitation is imposed on the mode of the liquid ejection head. A liquid ejection head of what is called a shuttle mode in which printing is conducted while scanning the liquid ejection head in a widthwise direction (for example, a direction perpendicular to a conveying direction) of the recording medium or a liquid ejection head of what is called a line head mode in which ejection orifices are arranged in the form of a line in a widthwise direction (for example, a direction perpendicular to a conveying direction) of the recording medium may also be used.

Aqueous Pigment Ink

A pigment ink which can form an image with good characteristics such as good weather resistance is used as an ink for forming an image. The pigment ink is an aqueous pigment ink containing a pigment as a coloring material and an aqueous liquid medium. The aqueous pigment ink will hereinafter be also referred to as a pigment ink merely. It is important for the pigment ink to further contain an anionic polymer aggregatable by the reaction liquid, and this anionic polymer mainly causes an aggregation reaction with the reaction liquid, thereby increasing the viscosity of the pigment ink to effectively inhibit the occurrence of blurring or bleeding to form a good image.

No particular limitation is imposed on the anionic polymer so long as it has an anionic functional group and is used in image formation in combination with the reaction liquid. Among others, a polymer composed of carboxylic acid, sulfonic acid or phosphonic acid or having an anionic group obtained by neutralizing such an acid with a metal salt or an organic amine is favorable. As examples thereof, there may be mentioned acrylic polymers and urethane polymers having a carboxyl group.

The anionic polymer is contained in the pigment ink as a dispersant of a pigment as a coloring material and/or as various additives.

The respective components of the pigment ink will hereinafter be described.

Pigment

No particular limitation is imposed on a coloring material of the pigment ink, i.e., a pigment that is a colorant component, and a publicly known black pigment or a publicly known organic pigment may be used. Specifically, a pigment represented by C.I. (Color Index) Number may be used. In addition, carbon black is favorably used as the black pigment. The content of the pigment in the pigment ink is favorably 0.5% by mass or more and 15.0% by mass or less, more favorably 1.0% by mass or more and 10.0% by mass or less based on the total mass of the pigment ink.

Anionic Polymer

The anionic polymer may be contained in the pigment ink as a soluble component and/or a dispersible component (for example, a resin particle). The pigment ink favorably contains at least an anionic polymer as a soluble component in that a better bright image is formed.

Dispersant

As a dispersant in the case where a dispersant-dispersion type pigment is used as a coloring material of an ink, any dispersant may be used so long as it is used in an ink jet aqueous ink. A water-soluble dispersant having both hydrophilic portion and hydrophobic portion at the same time in its structure is favorably used as the dispersant. In particular, a water-soluble resin dispersant composed of a resin containing at least a hydrophilic monomer and a hydrophobic monomer and obtained by copolymerizing such monomers is favorably used. When an anionic polymer is contained as the dispersant in the pigment ink, an anionic monomer is used as the above hydrophilic monomer.

No particular limitation is imposed on the respective monomers used here, and any monomers may be used so long as they give a water-soluble resin having a function as the intended dispersant. Specific examples of the hydrophobic monomer include styrene, styrene derivatives, alkyl (meth)acrylates and benzyl (meth)acrylate. Examples of the hydrophilic monomer include acrylic acid, methacrylic acid and maleic acid.

The acid value of the water-soluble resin dispersant is favorably 50 mg KOH/g or more and 550 mg KOH/g or less. The weight-average molecular weight of the water-soluble resin dispersant is favorably 1,000 or more and 50,000 or less, more favorably 5,000 or more and 10,000 or less. The acid value and the weight-average molecular weight in case where the anionic polymer on which the reaction liquid acts is used as the water-soluble resin dispersant are also favorably selected from these respective ranges. Incidentally, the mass ratio of the pigment to the dispersant is favorably within a range of from 1.0:0.1 to 1:3.

In addition, what is called a self-dispersion type anionic pigment obtained by subjecting the pigment itself to surface modification to enable dispersion in the aqueous liquid medium component of the pigment ink may also be used as the pigment. When the self-dispersion type anionic pigment is used without using the dispersant, an anionic polymer is added into the pigment ink as another additive than the dispersant. As examples of such an additive, there may be mentioned the above-described anionic polymer which can also be used as the dispersant and a resin particle having an anionic group which will be described subsequently.

Resin Particle

A colorless resin particle having no coloring material, for example, a resin fine particle may be contained and used in the pigment ink as an additive. Among others, the resin fine particle is favorable because it may have an effect to improve image quality and fixability in some case.

No particular limitation is imposed on the resin particle, and one or more resin particles of a material and a particle size that can be utilized in the intended image formation may be suitably chosen for use. Specific examples of the material of the resin particle include homopolymers such as polyolefin, polystyrene, polyurethane, polyester, polyether, polyuria, polyamide, polyvinyl alcohol, poly(meth)acrylic acid and salts thereof, polyalkyl (meth)acrylates, and polydiene, and copolymers obtained by combining a plurality of monomers among materials forming these homopolymers.

The amount of the resin particle in the pigment ink is favorably 1% by mass or more and 50% by mass or less, more favorably 2% by mass or more and 40% by mass or less based on the total mass of the pigment ink in that the aggregation reaction by the viscosity increasing component in the reaction liquid is made more effective, and liquid ejection performance by the liquid ejection head is made good.

The resin particle is favorably contained in a state of being dispersed in the aqueous liquid medium of the pigment ink. No particular limitation is imposed on the mode of dispersion of the resin particle in the pigment ink. However, a self-dispersion type or dispersant-dispersion type resin particle is favorably used. The self-dispersion type resin particle can be obtained by homopolymerizing a monomer having a dissociable group or copolymerizing plural kinds of such monomers. Examples of the dissociable group include a carboxyl group, a sulfonic acid group and a phosphoric acid group. Examples of the monomer having this dissociable group include acrylic acid and methacrylic acid. A polymer having an anionic group can be thereby obtained. When the anionic polymer is contained in the pigment ink in the form of the self-dispersion type resin particle, a self-dispersion type resin particle having an anionic group is used as such a resin particle.

The dispersant-dispersion type resin particle can be dispersed in the ink by its combined use with a dispersant. The dispersant may also be used in combination even when the self-dispersion type resin particle is used. Any dispersant may be used without particular limitation as the dispersant for dispersing the resin particle, for example, an emulsifier, so long as it can achieve the intended resin fine particle-dispersing effect irrespective of those of a low molecular weight or a high molecular weight. A surfactant may be used as such an emulsifier, and a nonionic surfactant or a surfactant having the same electric charge as the resin particle is favorable. When the resin particle having the anionic group is used, an anionic surfactant is favorably used.

The resin particle is desirably a fine particle having a dispersion particle size of 10 nm or more and 1,000 nm or less, more desirably a fine particle having a dispersion particle size of 100 nm or more and 500 nm or less.

Upon preparation of the pigment ink, the resin particle is favorably used in the form of a resin particle dispersion dispersed in a liquid (for example, an aqueous medium such as water). It is also favorable to add various kinds of additives upon preparation of the resin particle dispersion from the viewpoint of stabilization. As the additive for this stabilization, for example, n-hexadecane, dodecyl methacrylate, stearyl methacrylate, chlorobenzene, dodecylmercaptan, olive oil, a blue dye (Blue 70) or polymethyl methacrylate is favorable.

Surfactant

The pigment ink may contain a surfactant. Specific examples of the surfactant include ACETYLENOL EH (product of Kawaken Fine Chemicals Co., Ltd.) and ADEKA PLURONIC (product of Adeka Corporation). The amount of the surfactant in the pigment ink is favorably 0.01% by mass or more and 5.0% by mass or less based on the total mass of the pigment ink.

The surface tension of the pigment ink is favorably controlled to 25 mN/m or more and 45 mN/m or less in consideration of ink jet ejection suitability, and the relationship of the surface tension with the resin-containing liquid is set within a range corresponding to the present invention. That is, the surface tension of the pigment ink in the present invention is adjusted to be lower than the surface tension of a resin-containing liquid which will be described subsequently. This adjustment of the surface tension can be made by controlling the amount of the surfactant added.

Water and Water-Soluble Organic Solvent

The pigment ink is prepared by using at least a pigment as a coloring material and an aqueous liquid medium as a dispersion medium of the pigment. Water or a mixture of water and a water-soluble organic solvent may be used as the aqueous liquid medium. Water is favorably water deionized by ion exchange. The content of water in the pigment ink is favorably 30% by mass or more and 97% by mass or less based on the total mass of the pigment ink.

No particular limitation is imposed on the kind of the water-soluble organic solvent, and any solvent may be used so long as it can be utilized in an ink jet ink. Specific examples thereof include glycerol, diethylene glycol, polyethylene glycol and 2-pyrrolidone. At least one of the water-soluble organic solvents may be used. The content of the water-soluble organic solvent in the pigment ink is favorably 3% by mass or more and 70% by mass or less based on the total mass of the pigment ink.

Other Additives

The pigment ink may also contain various additives such as a pH adjustor, a rust preventive, a preservative, a mildewproofing agent, an antioxidant, an antireductant, a surface modifier, a water-soluble resin and a neutralizer thereof, and a viscosity modifier other than the above-described components as needed.

Resin-Containing Aqueous Liquid

In order to improve gloss-related characteristics such as glossiness and gloss uniformity of an image to form an image having high glossiness and gloss uniformity, i.e., a bright image, an image formed on a recording medium with the reaction liquid and the pigment ink is treated with a resin-containing aqueous liquid. The resin-containing aqueous liquid will hereinafter be also referred to as the resin-containing liquid merely. This resin-containing liquid contains at least an anionic polymer as a component capable of causing the aggregation reaction by the reaction liquid.

The resin-containing liquid may be any liquid so long as the treatment with such a liquid does not affect the image formed with the pigment ink, and it can form the intended bright image having high glossiness and gloss uniformity, and is favorably transparent, colorless transparent, milky white or white. Therefore, the ratio of a maximum absorbance to a minimum absorbance (maximum absorbance/minimum absorbance) of a liquid composition in a wavelength range of from 400 nm to 800 nm which is a wavelength range of visible light is favorably 1.0 or more and 2.0 or less. This means that the liquid composition does not substantially have an absorbance peak in the wavelength range of the visible light, or the intensity of the peak is extremely small if any. In addition, the resin-containing liquid favorably contains no coloring material. The absorbance can be measured by means of Hitachi Double Beam Spectrophotometer U-2900 (manufactured by Hitachi High-Technologies Corporation) by using a non-diluted resin-containing liquid. Incidentally, the resin-containing liquid may also be diluted to measure the absorbance. The reason for this is that a value of the ratio of the maximum absorbance to the minimum absorbance (maximum absorbance/minimum absorbance) does not depend on a dilution rate because both maximum absorbance and minimum absorbance are proportional to the dilution rate.

The anionic polymer may be contained in the resin-containing liquid as a soluble component and/or a dispersible component (for example, a resin particle). The resin-containing liquid favorably contains at least the anionic polymer as the soluble component in that a better bright image is formed. The content of the anionic polymer is favorably 1% by mass or more and 15% by mass or less, more favorably 3% by mass or more and 10% by mass or less based on the total mass of the resin-containing liquid in consideration of a gloss-developing effect and ink jet ejection suitability.

In the present invention, the resin-containing liquid is aqueous, and the surface tension of this aqueous resin-containing liquid, i.e., a resin-containing aqueous liquid, is required to be higher than the surface tension of the aqueous pigment ink for preventing the occurrence of image cracking. By doing so, permeation of the resin-containing liquid into the interior of a coloring layer by the pigment ink on the recording medium can be delayed or prevented to develop an effect of inhibiting the occurrence of image cracking caused by cracks that generate from the interior of the coloring layer by the pigment ink.

The respective components of the resin-containing liquid will hereinafter be described.

Water-Soluble Resin

When the resin-containing liquid contains an anionic polymer as a soluble component of an aqueous liquid medium, a water-soluble anionic polymer having both hydrophilic portion and hydrophobic portion at the same time in its structure is favorably used as the anionic polymer from the viewpoint of good solubility in the resin-containing liquid. In particular, a resin containing at least a hydrophilic monomer and a hydrophobic monomer and obtained by copolymerizing such monomers is favorably used. An anionic group is used as the hydrophilic group for achieving the effect of the present invention. Specific examples of the anionic group include acrylic acid, methacrylic acid and maleic acid. Examples of the hydrophobic monomer include styrene, styrene derivatives, alkyl (meth)acrylates and benzyl (meth)acrylate.

When the water-soluble anionic polymer is used, the acid value thereof is favorably 50 mg KOH/g or more and 550 mg KOH/g or less. The acid value is favorably lower for accelerating aggregation and solidification from the viewpoint of formation of a good image.

The weight-average molecular weight of the water-soluble anionic polymer is favorably 1,000 or more and 50,000 or less, more favorably 5,000 or more and 10,000 or less.

Resin Particle

A colorless resin particle having no coloring material, for example, a resin fine particle may be contained and used in the resin-containing liquid as an additive. Among others, the resin fine particle is favorable because it may have an effect to improve image quality and fixability in some case.

No particular limitation is imposed on the resin particle, and one or more resin particles of a material and a particle size that can be utilized in the intended image formation may be suitably chosen for use. Specific examples of the material of the resin particle include homopolymers such as polyolefin, polystyrene, polyurethane, polyester, polyether, polyurea, polyamide, polyvinyl alcohol, poly(meth)acrylic acid and salts thereof, polyalkyl (meth)acrylates, and polydiene, and copolymers obtained by combining a plurality of monomers among materials forming these homopolymers.

The amount of the resin particle in the resin-containing liquid is favorably 1% by mass or more and 50% by mass or less, more favorably 2% by mass or more and 40% by mass or less based on the total mass of the resin-containing liquid in that the aggregation reaction by the viscosity increasing component in the reaction liquid is made more effective, and liquid ejection performance by the liquid ejection head is made good.

The resin particle is favorably contained in a state of being dispersed in a liquid medium of the resin-containing liquid. No particular limitation is imposed on a mode of the dispersion of the resin particle in the resin-containing liquid. However, a self-dispersion type or dispersant-dispersion type resin particle is favorably used. The self-dispersion type resin particle can be obtained by homopolymerizing a monomer having a dissociable group or copolymerizing plural kinds of such monomers. Examples of the dissociable group include a carboxyl group, a sulfonic acid group and a phosphoric acid group. Examples of the monomer having this dissociable group include acrylic acid and methacrylic acid. A polymer having an anionic group can be thereby obtained. When the anionic polymer is contained in the resin-containing liquid in the form of the self-dispersion type resin particle, a self-dispersion type resin particle having an anionic group is used as such a resin particle.

The dispersant-dispersion type resin particle can be dispersed in the resin-containing liquid by its combined use with a dispersant. The dispersant may also be used in combination even when the self-dispersion type resin particle is used. Any dispersant may be used without particular limitation as the dispersant for dispersing the resin particle, for example, an emulsifier, so long as it can achieve the intended resin fine particle-dispersing effect irrespective of those of a low molecular weight or a high molecular weight. A surfactant may be used as such an emulsifier, and a nonionic surfactant or a surfactant having the same electric charge as the resin particle is favorable. When a resin particle having an anionic group is used, an anionic surfactant is favorably used. If the anionic polymer as an essential component for the above-described resin-containing liquid has a function as a dispersant of the resin particle, this anionic polymer can be used as a dispersant of the resin particle.

The resin particle is desirably a fine particle having a dispersion particle size of 10 nm or more and 1,000 nm or less, more desirably a fine particle having a dispersion particle size of 100 nm or more and 500 nm or less.

Upon preparation of the resin-containing liquid, the resin particle is favorably used in the form of a resin particle dispersion dispersed in a liquid (for example, an aqueous medium such as water). It is also favorable to add various kinds of additives upon preparation of the resin particle dispersion from the viewpoint of stabilization. As the additive for this stabilization, for example, n-hexadecane, dodecyl methacrylate, stearyl methacrylate, chlorobenzene, dodecylmercaptan, olive oil, a blue dye (Blue 70) or polymethyl methacrylate is favorable.

Surfactant

The resin-containing liquid may contain a surfactant. Specific examples of the surfactant include ACETYLENOL EH (product of Kawaken Fine Chemicals Co, Ltd.) and ADEKA PLURONIC (product of Adeka Corporation). The amount of the surfactant in the resin-containing liquid is favorably 0.01% by mass or more and 5.0% by mass or less based on the total mass of the resin-containing liquid.

In order to achieve the effect of the present invention, however, the surface tension of the resin-containing liquid is required to be controlled to be higher than the surface tension of the pigment ink. In addition, the surface tension of the resin-containing liquid is favorably 3 mN/m or more higher, more favorably 5 mN/m or more higher than the surface tension of the pigment ink. The amount of the surfactant added is adjusted so as to achieve the above requirement. Incidentally, the upper limit of a difference between these surface tensions may be set to be about 10 mN/m.

Water and Water-Soluble Organic Solvent

The resin-containing liquid is prepared by using at least an anionic polymer and an aqueous liquid medium. Water or a mixture of water and a water-soluble organic solvent may be used as the aqueous liquid medium. Water is favorably water deionized by ion exchange. The content of water in the resin-containing liquid is favorably 30% by mass or more and 97% by mass or less based on the total mass of the resin-containing liquid.

No particular limitation is imposed on the kind of the water-soluble organic solvent, and any solvent may be used so long as it can be used in the preparation of the intended resin-containing liquid. Specific examples thereof include glycerol, diethylene glycol, polyethylene glycol and 2-pyrrolidone. At least one of the water-soluble organic solvents may be used. The content of the water-soluble organic solvent in the resin-containing liquid is favorably 3% by mass or more and 70% by mass or less based on the total mass of the resin-containing liquid.

Other Additives

The resin-containing liquid may also contain various additives such as a pH adjustor, a rust preventive, a preservative, a mildewproofing agent, an antioxidant, an antireductant, a surface modifier, a water-soluble resin and a neutralizer thereof, and a viscosity modifier other than the above-described components as needed.

By applying the resin-containing liquid on to the coloring layer formed by the pigment ink on the recording medium, aggregation and solidification are caused by a reaction with the viscosity increasing component of the reaction liquid applied to the recording medium in advance, thereby forming a film by at least a resin of the resin-containing liquid applied to the surface of the coloring layer.

Drying after Application of Resin-Containing Liquid

The permeation of the resin-containing liquid into the interior of the coloring layer by the pigment ink is delayed by making the surface tension of the resin-containing liquid higher than the surface tension of the pigment ink, and in the delayed state film formation on the surface of the coloring layer is conducted by the viscosity increase of the resin-containing liquid, for example, aggregation and solidification as well as evaporation of a remaining solvent component.

In addition, a drying step of removing water from the image formed on the recording medium after the application of the resin-containing liquid is favorably provided. The evaporation of the remaining water in the image formed on the recording medium is accelerated, whereby the resin film formation by the application of the resin-containing liquid is advanced to more reduce the amount of permeation of the resin-containing liquid into the coloring layer, so that the image-cracking-preventing effect becomes more remarkable. From the above, it is favorable to provide the drying step after the application of the resin-containing liquid.

For the same reason as in the direct drawing type ink jet recording method, it is favorable to provide a step of removing water from an intermediate image formed on a transfer member (first recording medium) in a transfer type ink jet recording method which will be described subsequently.

Any of a heating method, a method of supplying low-humidity air, a pressure-reducing method and a method of combining these methods is suitably used as a drying method.

Estimated Mechanism of Occurrence of Image Cracking

By further treating the image formed on the recording medium with the resin-containing liquid, fixing of the image is accelerated, and further improvement in glossiness and gloss uniformity is achieved, whereby a bright image having high glossiness and gloss uniformity can be formed.

An estimated mechanism of image cracking generated upon the formation of the bright image will now be described with reference to FIGS. 2A to 2C.

Figure 2A:
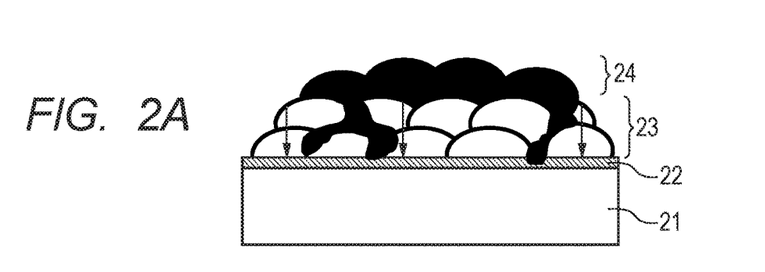
FIGS. 2A, 2B and 2C are drawings for explaining an estimated mechanism of occurrence of image cracking.
Figure 2B:
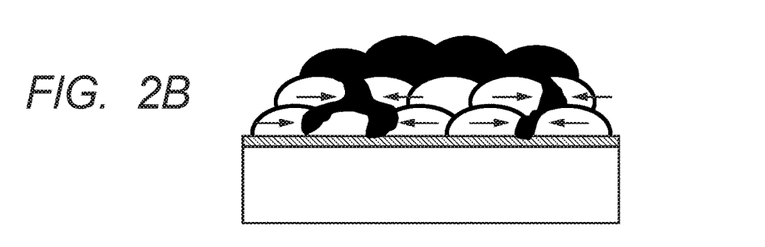
Figure 2C:
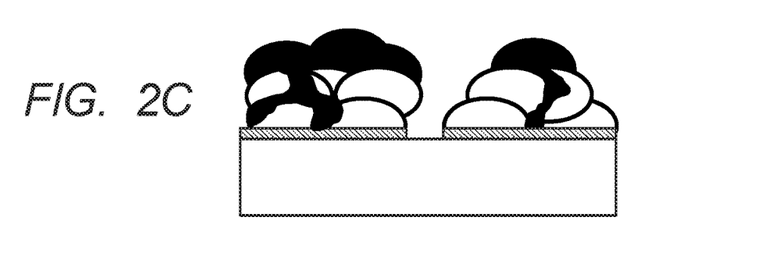

FIGS. 2A to 2C are drawings schematically illustrating a state of image formation in the sectional views in a thickness-wise direction of a recording medium. Droplets of a pigment ink are applied to a reaction liquid layer 22 applied on to a recording medium 21. The droplets of the pigment ink react with a viscosity increasing component contained in the reaction liquid layer 22 to form a coloring layer 23 forming an image in its viscosity-increased state. In the surface of the coloring layer 23, there are linking sites or stacking sites of dots; thus, it is considered that the interspace through which a liquid permeates into the interior of the coloring layer is ununiformly present in the whole layer. A resin-containing liquid 24 applied to the surface of the coloring layer 23 permeates into the interspace in the coloring layer 23 in the direction illustrated in FIG. 2A to cause an aggregation and solidification reaction with the reaction liquid present on the surface of the recording medium or in the interior of the coloring layer 23. Since the aggregation and solidification reaction of the resin-containing liquid having permeated into the ununiformly present interspace affects the coloring layer itself, that is, uneven aggregation and shrinkage stress is caused in directions of the arrows illustrated in FIG. 2B in the interior of the coloring layer 23, it is thus inferred that cracks are generated in the interior of the coloring layer 23 as illustrated in FIG. 2C to cause image cracking.

For example, when solidification is sufficiently accelerated by acceleration of aggregation of the coloring layer 23 or by drying and evaporation of a solvent component in the resin-containing liquid if the uneven aggregation and shrinkage stress of the resin-containing liquid is caused, it is known that the occurrence of the image cracking can be inhibited.

However, the interval between ejection of the pigment ink and ejection of the resin-containing liquid is very short and is about 100 ms, so that the coloring layer formed by the pigment ink cannot form a hard state sufficient to prevent the occurrence of the image cracking due to the influence of remaining water. In other words, the pigment ink droplet after the contact with the reaction liquid retains a liquid state having a surface tension. Accordingly, the image is moved by the uneven aggregation and shrinkage stress of the resin-containing liquid, so that it may be difficult in some cases to avoid the occurrence of the image cracking.

In the present invention, the permeation of the resin-containing liquid into the interior of the coloring layer formed by the pigment ink is delayed by making the surface tension of the resin-containing liquid higher than the surface tension of the pigment ink, whereby the image cracking of the coloring pigment ink layer caused by the occurrence of the uneven aggregation and shrinkage stress can be prevented even under an environment of high-speed printing. A liquid with low surface tension generally has a nature of wetting and spreading into a liquid with high surface tension. Since the surface tension of the resin-containing liquid is higher than the pigment ink in the present invention, the flowing of a liquid is directed toward the resin-containing liquid from the pigment ink. It is thus considered that the permeation itself of the resin-containing liquid into the coloring layer formed by the pigment ink is delayed. When the difference between the surface tensions is 3 mN/m or more, the image-cracking-preventing effect by the delay of the permeation becomes remarkable. It is considered that in the delayed state of the permeation, evaporation of water in the resin-containing liquid as well as aggregation and solidification occur on the surface of the coloring layer formed by the pigment ink, and consequently such a state that a film of the resin-containing liquid is formed on the surface of the coloring layer can be created with the image cracking prevented. Incidentally, regarding the coloring layer formed by the contact between the pigment ink droplet and the reaction liquid, the surface tension of an upper portion of the coloring layer upon the contact with the resin-containing liquid is dominated by the surface tension of the pigment ink forming the coloring layer. It is thus considered that regarding the reaction liquid located under the coloring layer, the influence of the surfactant in the reaction liquid is hard to be reflected in the upper portion of the coloring layer on which the resin-containing liquid impacts. In other words, it is inferred that the reaction liquid and the ink do not sufficiently mix at the interval between ejection of the pigment ink and ejection of the resin-containing liquid.

(2) Transfer Type Ink Jet Recording Method

Figure 4:
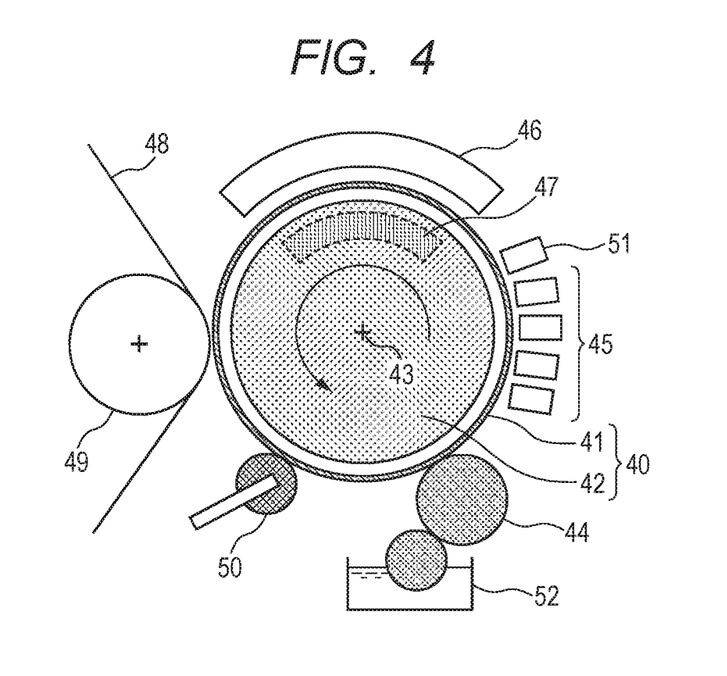
FIG. 4 illustrates an example of a transfer type ink jet image forming apparatus for carrying out the present invention.

FIG. 4 schematically illustrates a transfer type ink jet recording apparatus. In FIG. 4, a transfer member 40 which is a first recording medium includes a support member 42 of a rotatable drum form and a surface layer member 41 arranged on an outer peripheral surface of the support member 42. The transfer member 40 (support member 42) is rotationally driven in a direction (anticlockwise direction) of the arrow on a rotational shaft 43. The apparatus is so constructed that respective structures (members) arranged around the transfer member 40 are operated in synchronization with the rotation of the transfer member 40. A reaction liquid is applied to the transfer member 40 by a roller type coating device 44. This roller type coating device 44 has a coating roller system composed of a reaction liquid tank for storing a reaction liquid 52, a coating roller for applying the reaction liquid to the surface of the surface layer member and a supply roller for supplying the reaction liquid to the coating roller from the reaction liquid tank. A pigment ink is applied from a liquid ejection head (recording head) 45 of an ink jet system to form an intermediate image, which is a mirror-inverted image of a desired image, on the transfer member 40. At that time, a component contained in the pigment ink is aggregated by contact of the reaction liquid applied on to the transfer member 40 in advance with the coloring pigment ink to form a coloring ink layer.

When the transfer member 40 reaches a position of a liquid ejection head 51, a resin-containing liquid is applied on to the image formed in advance. The resin-containing liquid is also aggregated by contact with the reaction liquid like the pigment ink to form a resin layer containing no coloring material on the image. Thereafter, the temperature of the intermediate image formed on the transfer member may also be controlled by a temperature controlling mechanism 47 so as to become a desired temperature. At this time, a liquid in the intermediate image formed on the transfer member may also be removed by a liquid removing mechanism 46. A second recording medium 48 is then bright into contact with the transfer member 40 by means of a pressure roller 49 to transfer the intermediate image to the second recording medium 48. A cleaning unit 50 may also be provided as a unit for cleaning the surface of the transfer member after the intermediate image is transferred to the second recording medium 48. Incidentally, the same one as the recording medium used in the above-described direct drawing type ink jet recording method may be used as the second recording medium 48. In addition, as for the reaction liquid, the aqueous pigment ink and the resin-containing aqueous liquid, the same ones as the reaction liquid, the aqueous pigment ink and the resin-containing aqueous liquid which are used in the above-described direct drawing type ink jet recording method may be used.

Transfer Member

The transfer member which is the first recording medium is a recording medium for holding a liquid composition and an ink, on which an intermediate image is recorded. An example of the transfer member includes one having a support member for handling the transfer member itself and transmitting necessary force and a surface layer member on which the intermediate image is recorded. Incidentally, the support member and the surface layer member may be formed integrally.

As examples of the shape of the transfer member, there may be mentioned a sheet-shape, a roller-shape, a drum-shape, a belt-shape and an endless web-shape. The size of the transfer member may be suitably set according to the size of a recordable transfer medium.

The support member of the transfer member is required to have certain strength from the viewpoints of conveyance accuracy and durability thereof. A metal, ceramic or resin is favorable as a material of the support member. Among these, aluminum, iron, stainless steel, acetal resin, epoxy resin, polyimide, polyethylene, poly(ethylene terephthalate), nylon, polyurethane, silica ceramic or alumina ceramic is favorable. When the support member is formed by such a material, stiffness capable of withstanding a pressure upon transfer and dimensional accuracy can be secured, and moreover inertia upon operation can be relieved to improve the responsiveness of control. Incidentally, these materials may be used either singly or in any combination thereof.

The surface layer of the transfer member is required to have certain elasticity for transferring the intermediate image to the transfer medium such as paper. Supposing that, for example, paper is used as the transfer medium, the surface layer of the transfer member favorably has a Durometer Type A hardness (according to JIS K 6253) of 10° or more and 100° or less, more favorably 20° or more and 60° or less. A metal, ceramic or resin is favorable as a material of the surface layer member forming a surface layer of the transfer member. Among these, polybutadiene rubber, nitrile rubber, chloroprene rubber, silicone rubber, fluorine-containing rubber, fluorosilicone rubber, urethane rubber, styrene rubber, olefin elastomer, vinyl chloride elastomer, ester elastomer, amide elastomer, polyether, polyester, polystyrene, polycarbonate, siloxane compounds or perfluorocarbon compounds are favorable, and the siloxane compound is more favorable. The surface layer member may also be formed by laminating a plurality of materials. Examples thereof include a material obtained by laminating silicone rubber on an endless belt-shaped urethane rubber sheet and a material obtained by forming a film of a siloxane compound on a urethane rubber sheet.

In addition, the surface of the transfer member may be subjected to a surface treatment before use. Examples of the surface treatment include a flame treatment, a corona treatment, a plasma treatment, a polishing treatment, a roughening treatment, an active energy ray irradiation treatment, an ozone treatment, a surfactant treatment and a silane coupling treatment. Some of these treatment may also be used in combination.

In addition, the surface arithmetic mean roughness of the surface of the transfer member is favorably 0.01 μm or more and 3 μm or less as prescribed in JIS B 0601:2001 from the viewpoint of inhibiting the flowing of the intermediate image on the transfer member. Further, the contact angle to water of the surface of the transfer member is favorably 50° or more and 110° or less, more favorably 60° or more and 100° or less.

EXAMPLES

The present invention will hereinafter be described more specifically by Examples of the image forming method according to the present invention. The present invention is not limited by the following Examples unless going beyond the gist thereof. Incidentally, all designations of "part" or "parts" and "%" are based on mass unless expressly noted.

Image Formation According to Direct Drawing Type Ink Jet Recording Method

An image was formed by using a direct drawing type ink jet image forming apparatus illustrated in FIG. 1. Coat paper (MIRROR COAT G, ream weight: 127.9 g/m$^2$, product of Oji Paper Co., Ltd.) was used as a recording medium. The sheet fixing member for fixing the coat paper was temperature-controllable to set its temperature to 50° C. In addition, the coating weight of a reaction liquid applied on to the coat paper was set to 1 g/m$^2$. Further, both liquid ejection device for a pigment ink and liquid ejection device for a resin-containing liquid have a liquid ejection head of a type in which an ink is ejected by an On-Demand system using an electrothermal converter. These liquid ejection heads take a line head mode in which ejection orifices are arranged linearly in a direction perpendicular to a conveying direction of the coat paper.

An image was formed by setting each of ejection amounts of the pigment ink and the resin-containing liquid and nozzle resolution to 3.0 pl and 1,200 dpi, respectively.

In this example, the case where four ejections are performed on a region 600 dpi long and 600 dpi wide was defined as 100% duty. After the reaction liquid was applied to the coat paper, a solid image of 200% duty or 300% duty was formed with the pigment ink, and the resin-containing liquid was then ejected at 200% duty on the image, thereby forming a bright image having high glossiness and gloss uniformity. In addition, the interval between the ejection of the pigment ink and the ejection of the resin-containing liquid was set to 100 ms. In the case where a hot air drying device was used, hot air drying was conducted for 5 seconds under conditions of a temperature proximately above the paper surface of 90° C. and a wind velocity of 7 m/s after several tens milliseconds from the formation of the bright image.

Reaction Liquid

The reaction liquid used in the present invention was prepared by mixing components of the following composition, sufficiently stirring the resultant mixture and then filtering the mixture under pressure through a microfilter (product of Fuji Photo Film Co., Ltd.) having a pore size of 3.0 μm.
Citric acid: 30.0%
Glycerol: 15.0%
ACETYLENOL EH (product of Kawaken Fine Chemicals Co., Ltd.): 1.0%
Pure water: 54.0%

Pigment Ink

A black pigment ink was used in this example. The preparation procedure thereof will hereinafter be described.

1) Preparation of Black Pigment Dispersion Liquid

Ten percent of carbon black (trade name: Monarch 1100, product of Cabot Co.), 15% of an aqueous solution of a pigment dispersant (styrene-ethyl acrylate-acrylic acid terpolymer, acid value: 150 mg KOH/g, weight-average molecular weight: 8,000, solid content: 20%, neutralized with potassium hydroxide) and 75% of pure water were mixed. A batch type vertical sand mill (manufactured by IMEX Co.) was charged with the resultant mixture and 200% of zirconia beads having a diameter of 0.3 mm to conduct a dispersing treatment for 5 hours while cooling with water. The thus-obtained dispersion liquid was centrifuged by a centrifugal separator to remove coarse particles, thereby obtaining a black pigment dispersion liquid having a pigment concentration of about 10%. This black pigment dispersion liquid was used in preparation of a pigment ink which will be described subsequently.

2) Preparation of Resin Fine Particle Dispersion

Eighteen percent of butyl methacrylate, 2% of 2,2'-azobis-(2-methylbutyronitrile) and 2% of n-hexadecane were mixed and stirred for 0.5 hours. This mixture was added dropwise to 78% of a 6% aqueous solution of NIKKOL BC15 (product of Nikko Chemicals Co., Ltd.), which is an emulsifier, and the resultant mixture was stirred for 0.5 hours. The mixture was then irradiated with ultrasonic waves for 3 hours by an ultrasonic wave irradiation machine. A polymerization reaction was then conducted for 4 hours at 80° C. under a nitrogen atmosphere, and filtration was conducted after cooling at room temperature to obtain a resin fine particle dispersion having a concentration of about 20%. The mass-average molecular weight of the resin fine particle was about 1,000 or more and about 2,000,000 or less, and the dispersion particle size thereof was about 100 nm or more and about 500 nm or less. This resin fine particle dispersion was used in preparation of the pigment ink and Resin-containing liquids 8, 9 which will be described subsequently.

3) Preparation of Pigment Ink

A black ink having the following composition was prepared. Specifically, the black ink was obtained by mixing components of the following formulation, sufficiently stirring the resultant mixture and then filtering the mixture under pressure through a microfilter (product of Fuji Photo Film Co., Ltd.) having a pore size of 3.0 μm.

Formulation

Black pigment dispersion liquid (concentration: about 10%): 20%
Resin fine particle dispersion (concentration: about 20%): 50%
Glycerol: 5%
Diethylene glycol: 7%
L31 (product of Adeka Corporation): 1.5%
Pure water: 17.5%

Preparation of Resin-Containing Liquid

The compositions of respective resin-containing liquids used in this example are as shown in the following Table 1. After respective components were mixed and sufficiently stirred, the resultant mixtures were filtered under pressure through a microfilter (product of Fuji Photo Film Co., Ltd.) having a pore size of 3.0 μm, thereby preparing the respective resin-containing liquids.

TABLE 1

| Resin-containing liquid | Resin component | | Resin particle dispersion | glycerol | Surfactant | Pure water |
|---|---|---|---|---|---|---|
| 1 | Resin 1 | 10.0% | — | 7.0% | 1.0% | 82.0% |
| 2 | Resin 1 | 10.0% | — | 7.0% | 0.6% | 82.4% |
| 3 | Resin 1 | 10.0% | — | 7.0% | 0.4% | 82.6% |
| 4 | Resin 1 | 10.0% | — | 7.0% | 0.2% | 82.8% |
| 5 | Resin 1 | 10.0% | — | 7.0% | 0.1% | 82.9% |
| 6 | Resin 2 | 8.0% | — | 7.0% | 1.0% | 84.0% |
| 7 | Resin 2 | 8.0% | — | 7.0% | 0.1% | 84.9% |
| 8 | Resin 1 | 3.0% | 25.0% | 7.0% | 1.0% | 64.0% |
| 9 | Resin 1 | 3.0% | 25.0% | 7.0% | 0.1% | 64.9% |
| 10 | Resin 1 | 3.0% | 25.0% | 7.0% | 0.4% | 64.6% |
| 11 | Resin 1 | 3.0% | 25.0% | 7.0% | 0.2% | 64.8% |
| 12 | Resin 1 | 3.0% | 25.0% | 7.0% | 0.15% | 64.85% |

Resin particle dispersion: The resin particle dispersion prepared in "2) Preparation of resin fine particle dispersion"
Surfactant: ACETYLENOL EH (product of Kawaken Fine Chemicals Co., Ltd.)
Resin 1 (anionic polymer): A styrene-acryl-butyl acrylate terpolymer (acid value: 120 mg KOH/g, molecular weight: 12,000)
Resin 2 (anionic polymer): A styrene-acryl-butyl acrylate terpolymer (acid value: 90 mg KOH/g, molecular weight: 12,000)

Comparison of surface tensions of pigment ink and respective resin-containing liquids The surface tensions of the pigment ink and the respective resin-containing liquids prepared above are shown in the following Table 2. Incidentally, each surface tension was measured by an automatic surface tensiometer (manufactured by Kyowa Interface Science Co., Ltd.).

TABLE 2

| | Surface tension (mN/m) |
|---|---|
| Pigment ink | 37.0 |
| Resin-containing liquid 1 | 31.5 |
| Resin-containing liquid 2 | 36.5 |
| Resin-containing liquid 3 | 38.0 |
| Resin-containing liquid 4 | 40.0 |
| Resin-containing liquid 5 | 43.0 |
| Resin-containing liquid 6 | 31.0 |
| Resin-containing liquid 7 | 39.5 |
| Resin-containing liquid 8 | 31.0 |
| Resin-containing liquid 9 | 43.0 |
| Resin-containing liquid 10 | 38.0 |
| Resin-containing liquid 11 | 40.0 |
| Resin-containing liquid 12 | 42.0 |

Examples and Comparative Examples of the present invention will hereinafter be described.

Examples 1-1 to 1-9 and Comparative Examples 1-1 to 1-4

Each of the resin-containing liquids shown in Table 1 was used as the resin-containing liquid to form a bright image by image formation according to the above-described direct drawing type ink jet recording method. A drying method after the formation of the bright image is shown in Table 4. Incidentally, the natural drying is a drying method in which the image is left to stand without using a hot air drying device, and the hot air drying is a drying method in which hot air is allowed to blow against the image by using a hot air drying device.

Evaluation of Image-Cracking-Inhibiting Effect

Figure 3:
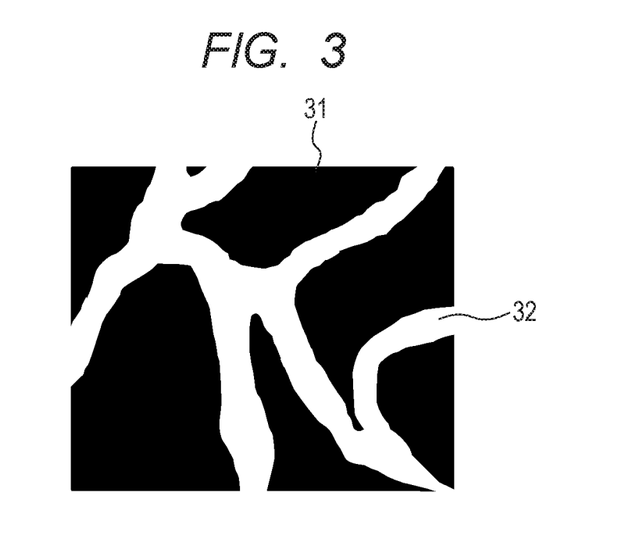
FIG. 3 illustrates an example of a method for quantitatively comparing an image cracking state.

Image formation was conducted according to the conditions of respective Examples and Comparative Examples to quantitatively compare the degrees of image cracking generated at that time. The image formation was conducted by forming a 300% duty solid image with the pigment ink and then ejecting each resin-containing liquid at 200% duty on that solid image. Regarding the quantification of the image cracking, the surface (500 µm×700 µm) of the bright image taken in a dark field with an optical microscope was taken into a commercially-available image processing software (Adobe Photoshop CS5, product of Adobe Systems Inc.) to convert it to a gray scale image, thereby obtaining a two-gradation image. An image illustration when converted to the two-gradation image is illustrated in FIG. 3, and in this illustration, the image is divided into an image portion 31 and a crack portion 32. Thereafter, the proportion of the number of pixels in a 255 gradation area (the number of pixels in the image cracking portion) to the number of pixels in the whole image (proportion of the image cracking portion) is quantitatively determined to evaluate the degree of the image cracking according to the criterion shown in following Table 3.

TABLE 3

| Proportion of image cracking portion | Evaluation |
|---|---|
| 0% or more and less than 2% | A |
| 2% or more and less than 3% | B |
| 3% or more and less than 5% | C |
| 5% or more and less than 15% | D |
| 15% or more | E |

Results obtained by comparing the degrees of the image cracking by using the above-described quantitative method are shown in Table 4.

TABLE 4

| | Resin-containing liquid | Drying method | Degree of image cracking |
|---|---|---|---|
| Ex. 1-1 | 3 | Natural drying | C |
| Ex. 1-2 | 4 | Natural drying | B |
| Ex. 1-3 | 5 | Natural drying | A |
| Ex. 1-4 | 7 | Natural drying | C |
| Ex. 1-5 | 7 | Hot air drying | B |
| Ex. 1-6 | 9 | Natural drying | A |
| Ex. 1-7 | 10 | Natural drying | C |
| Ex. 1-8 | 11 | Natural drying | B |
| Ex. 1-9 | 12 | Natural drying | A |
| Comp. Ex. 1-1 | 1 | Natural drying | D |
| Comp. Ex. 1-2 | 2 | Natural drying | D |
| Comp. Ex. 1-3 | 6 | Natural drying | E |
| Comp. Ex. 1-4 | 8 | Natural drying | D |

Example 1-10

Evaluation of Glossiness and Gloss Uniformity

An image obtained by conducting printing on coat paper (MIRROR COAT G, product of Oji Paper Co., Ltd.) at 200% duty or 300% duty with the above-described pigment ink by means of the direct drawing type ink jet image forming apparatus used in Example 1-1 and then ejecting Resin-containing liquid 4, and an image obtained by conducting only the printing at 200% duty or 300% duty with the pigment ink were subjected to glossiness measurement. PG-II/IIM (manufactured by Nippon Denshoku Industries Co., Ltd.) was used in the glossiness measurement to measure gloss at 20°. In addition, the gloss value (expressed as a GB1 value) at 20° was measured at ten points on the image. Measured results were evaluated according to the following criterion.
A: The measured value is distributed between 55 or more and 60 or less in terms of the GB1 value
B: The measured value is distributed between 50 or more and less than 55 in terms of the GB1 value
C: The measured value is distributed between 45 or more and less than 50 in terms of the GB1 value Results obtained by comparing the gloss values according to the above criterion are shown in Table 5.

TABLE 5

| Kind of image according to recording conditions | Evaluation result according to GB1 value |
|---|---|
| Image obtained by ejecting Resin-containing liquid 4 at 200% duty on 200% duty image by pigment ink | A |
| Image obtained by ejecting Resin-containing liquid 4 at 200% duty on 300% duty image by pigment ink | A |
| Image obtained by conducting only the printing at 200% duty by pigment ink | C |
| Image obtained by conducting only the printing at 300% duty by pigment ink | B |

It is understood from Table 5 that the image obtained by ejecting the resin-containing liquid had the high glossiness value, and the glossiness thereof is uniform irrespective of images.

From the above, it is understood that when the surface tension of the resin-containing liquid is higher than that of the pigment ink, the image-cracking-inhibiting effect is achieved, and a more remarkable effect is developed when the difference in surface tension is 3 mN/m or more. In Comparative Example 1-3, the proportion of the image cracking portion is as large as 15% or more, because the resin with the low acid value is used as the water-soluble resin in the resin-containing liquid, resulting in such a condition that image cracking is easily generated. Even when such a resin is used, the image cracking portion is reduced to about 3 to 5% by the image-cracking-inhibiting effect in the case where the surface tension of the resin-containing liquid was made higher than that of the coloring pigment ink as found in Examples 1 to 4. In addition, it was known that when the hot air drying is conducted, an effect to reduce the image cracking to about 0 to 3% is exhibited. The reason for this is considered to be principally attributable to the action that evaporation of water in the resin-containing liquid whose permeation is delayed is accelerated to accelerate the solidification of the resin-containing liquid, and so the amount of the resin-containing liquid which contributes to the permeation can be more reduced compared with the natural drying.

Image Formation According to Transfer Type Ink Jet Recording Method

An image was formed by using the transfer type ink jet image forming apparatus illustrated in FIG. 4. The following was used as a transfer member which is a first recording medium.

The transfer member was a two-layer structure formed by a support member and a surface layer member. In this structure, a flat plate formed of an aluminum alloy was used as the support member of the transfer member from the viewpoint of required characteristics such as stiffness capable of withstanding a pressure upon transfer and dimensional accuracy. As the surface layer member of the transfer member, a siloxane compound surface layer was formed according to the following method using a hydrolyzable organic silicon compound as a raw material. Glycidoxypropyltriethoxysilane and methyltriethoxysilane were mixed at a molar ratio of 1:1, and refluxing under heat was conducted for 24 hours or more in an aqueous medium by using hydrochloric acid as a catalyst to obtain a hydrolyzable condensate solution. The hydrolyzable condensate solution was diluted to 10 to 20% by mass with methyl isobutyl ketone, and a photocationic polymerization initiator (SP150, product of Adeka Corporation) was added in an amount of 5% by mass with respect to the solid content to obtain a desired coating solution. The coating solution of the above composition was used to form a film on the support member by spin coating. As a pretreatment of the support member, a plasma treatment was conducted on the surface thereof to improve its coatability and adhesion to a surface layer. The thus-formed film was then irradiated with light from a UV lamp, exposed and heated for 3 hours at 130° C. to obtain a cured product. The film thickness of the surface layer by the cured product at this time was 0.3 μm.

In addition, the above coat paper (MIRROR COAT G, ream weight: 127.9 g/m², product of Oji Paper Co., Ltd.) was used as a second recording medium.

A liquid ejection device for a pigment ink, a liquid ejection device for a resin-containing liquid and ejection amounts of the pigment ink and the resin-containing liquid were set to the same conditions as in Examples of the above-described direct drawing type ink jet image forming apparatus.

In this example, a case where four ejections are performed on a region 600 dpi long and 600 dpi wide was defined as 100% duty. After the reaction liquid was applied to the transfer member, a solid image of 200% duty or 300% duty was formed with the pigment ink, and the resin-containing liquid was then ejected at 200% duty on the image, thereby forming a bright image having high glossiness and gloss uniformity. In addition, an interval between the ejection of the pigment ink and the ejection of the resin-containing liquid was set to 100 ms.

Examples and Comparative Example of the present invention will hereinafter be described.

Examples 2-1 to 2-4 and Comparative Example 2-1

Each of the resin-containing liquids shown in Table 1 was used as the resin-containing liquid to form a bright image by image formation according to the above-described transfer type ink jet recording method. The drying method after the formation of the bright image is shown in Table 7. Incidentally, the natural drying is a drying method in which the image is left to stand without using a hot air drying device.

Evaluation of Image-Cracking-Inhibiting Effect

Image formation was conducted according to the conditions of respective Examples and Comparative Example to evaluate the degrees of image cracking occurred at that time in the same manner as in Example 1-1. The criterion of the evaluation is as shown in the following Table 6.

TABLE 6

| Proportion of image cracking portion | Evaluation |
| --- | --- |
| 0% or more and less than 2% | A |
| 2% or more and less than 3% | B |
| 3% or more and less than 5% | C |
| 5% or more and less than 15% | D |
| 15% or more | E |

Results obtained by comparing the degrees of the image cracking by using the above-described quantitative method are shown in Table 7.

TABLE 7

| | Resin-containing liquid | Drying method | Degree of image cracking |
| --- | --- | --- | --- |
| Ex. 2-1 | 3 | Natural drying | C |
| Ex. 2-2 | 10 | Natural drying | C |
| Ex. 2-3 | 11 | Natural drying | B |
| Ex. 2-4 | 12 | Natural drying | A |
| Comp. Ex. 2-1 | 1 | Natural drying | D |

Example 2-5

Evaluation of Glossiness and Gloss Uniformity

An image obtained by conducting printing on coat paper (MIRROR COAT G, product of Oji Paper Co., Ltd.) at 200% duty or 300% duty with the above-described pigment ink by means of the transfer type ink jet image forming apparatus used in Example 2-1 and then ejecting Resin-containing liquid 3, and an image obtained by conducting only the printing at 200% duty or 300% duty with the pigment ink were subjected to glossiness measurement. The evaluation method is the same as in Example 1-10. Evaluation results are shown in Table 8.

TABLE 8

| Kind of image according to recording conditions | Evaluation result according to GB1 value |
| --- | --- |
| Image obtained by ejecting Resin-containing liquid 3 at 200% duty on 200% duty image by pigment ink | A |
| Image obtained by ejecting Resin-containing liquid 3 at 200% duty on 300% duty image by pigment ink | A |
| Image obtained by conducting only the printing at 200% duty by pigment ink | C |
| Image obtained by conducting only the printing at 300% duty by pigment ink | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-089105, filed Apr. 24, 2015, which is hereby incorporated by reference herein in its entirety.

What is claimed is:

1. An ink jet recording method in which an image is formed by applying onto a recording medium a reaction liquid, an aqueous pigment ink containing an anionic polymer aggregatable by the reaction liquid and a resin-containing aqueous liquid containing an anionic polymer aggregatable by the reaction liquid to form an image, the method comprising the steps of:
    applying the reaction liquid to the recording medium;
    applying the aqueous pigment ink to a surface of the recording medium to which the reaction liquid is applied by an ink jet method to form an image; and
    applying the resin-containing aqueous liquid to the image formed on the recording medium by the ink jet method,
    wherein a surface tension of the resin-containing aqueous liquid is higher than a surface tension of the aqueous pigment ink.

2. The ink jet recording method according to claim 1, wherein the surface tension of the resin-containing aqueous liquid is 3 mN/m or more higher than the surface tension of the aqueous pigment ink.

3. The ink jet recording method according to claim 1, wherein the surface tension of the resin-containing aqueous liquid is 5 mN/m or more higher than the surface tension of the aqueous pigment ink.

4. The ink jet recording method according to claim 1, wherein the recording medium is cast-coated paper.

5. The ink jet recording method according to claim 1, wherein the anionic polymer is a water-soluble resin having a weight-average molecular weight of 5,000 or more and 10,000 or less.

6. The ink jet recording method according to claim 1, further comprising a step of removing water from the image formed on the recording medium after the step of applying the resin-containing aqueous liquid.

7. An ink jet recording method in which an image is formed by applying onto a first recording medium a reaction liquid, an aqueous pigment ink containing an anionic polymer aggregatable by the reaction liquid and a resin-containing aqueous liquid containing an anionic polymer aggregatable by the reaction liquid followed by transferring the intermediate image formed on the first recording medium to a second recording medium, the method comprising the steps of:
    applying the reaction liquid to the first recording medium;
    applying the aqueous pigment ink to a surface of the first recording medium to which the reaction liquid is applied by an ink jet method to form an image; and
    applying the resin-containing aqueous liquid to the image formed on the first recording medium by the ink jet method,
    wherein a surface tension of the resin-containing aqueous liquid is higher than a surface tension of the aqueous pigment ink.

8. The ink jet recording method according to claim 7, wherein the surface tension of the resin-containing aqueous liquid is 3 mN/m or more higher than the surface tension of the aqueous pigment ink.

9. The ink jet recording method according to claim 7, wherein the surface tension of the resin-containing aqueous liquid is 5 mN/m or more higher than the surface tension of the aqueous pigment ink.

10. The ink jet recording method according to claim 7, wherein the first recording medium is a transfer member, and the transfer member has a support member and a surface layer member on the support member.

11. The ink jet recording method according to claim 10, wherein the surface layer member comprises a siloxane compound.

12. The ink jet recording method according to claim 7, wherein the second recording medium is cast-coated paper.

13. The ink jet recording method according to claim 7, wherein the anionic polymer comprises a water-soluble resin having a weight-average molecular weight of 5,000 or more and 10,000 or less.

14. The ink jet recording method according to claim 7, further comprising a step of removing water from the intermediate image formed on the first recording medium after the step of applying the resin-containing aqueous liquid.

* * * * *